United States Patent [19]

Hendriks

[11] 4,077,040

[45] Feb. 28, 1978

[54] GUARD JETS IN MULTIPLE NOZZLE PRINTING

[75] Inventor: Ferdinand Hendriks, Yorktown Heights, N.Y.

[73] Assignee: International Business Machines Corporation, Armonk, N.Y.

[21] Appl. No.: 734,780

[22] Filed: Oct. 22, 1976

Related U.S. Application Data

[62] Division of Ser. No. 591,984, June 30, 1975, abandoned.

[51] Int. Cl.[2] .......... G01D 15/18

[52] U.S. Cl. .......... 346/75

[58] Field of Search .......... 346/1, 75, 140

[56] References Cited

U.S. PATENT DOCUMENTS 3,803,628 4/1974 Van Brimer .......... 346/75 X

OTHER PUBLICATIONS

Fisher et al.; Reducing Drop Misregistration . . . In a Linear Ink Jet Array; IBM Tech. Disc. Bulletin, vol. 17, No. 10, Mar. 1975, pp. 3066–3067.

*Primary Examiner*—Joseph W. Hartary

*Attorney, Agent, or Firm*—Jack M. Arnold

[57] ABSTRACT

In a jet printing system which includes an array of N nozzles, the droplet streams emitted from at least the first and Nth nozzle are continuously guttered, and the droplet streams emitted from the other nozzles are one of selectively guttered or directed to a printing medium. Alternatively, the array may be comprised of N rows and M columns of nozzles. The droplet streams emitted from at least the first and Nth row, through the first through Mth column are permanently guttered, and the droplet streams emitted from the other nozzles are one of selectively guttered or directed to a printing medium. In each instance, the air flow created by the permanently guttered droplet streams reduces the aerodynamic retardation of the other droplet streams, thereby reducing the misregistration of the droplets on the printing medium. In one embodiment, the guttered droplet streams comprise a non-marking liquid such as water, and the other droplet streams comprise a marking liquid such as ink.

6 Claims, 6 Drawing Figures

GUARD JETS IN MULTIPLE NOZZLE PRINTING

This is a division, of application Ser. No. 591,984 filed June 30, 1975 now abandoned.

BACKGROUND OF THE INVENTION

Localized aerodynamic drag is more pronounced on the perimeter of certain groups of aerodynamic bodies passing through air. In an ink jet array, the differential aerodynamic retardation between streams causes progressive drop velocity reduction from the center to either edge of the ink jet array, which results in misregistration of droplets on the printing medium. The cause of the retardation of the droplets near the edge of the printing medium relative to those near the center is caused by the aerodynamic drag. All droplets experience a velocity reduction during flight, but the effect is more pronounced near the array edges, where the droplets are less shielded from the ambient air. The consequence of aerodynamic retardation is that droplets near the array edge strike the printing medium at a later time than do droplets near the center. The printed array which results is a curved rather than a straight line as desired.

Two methods of correcting for the effect of aerodynamic retardation on a droplet array are set forth in an article entitled "Reducing Drop Misregistration From Differential Aerodynamic Retardation in a Linear Ink Jet Array" by D. E. Fisher and D. L. Sipple in the IBM Technical Disclosure Bulletin, Volume 17, No. 10, March 1975.

The first correction method compensates for the effect of aerodynamic retardation by applying deflection information to the outer droplets in the array at a predetermined time earlier than the deflection information is applied to the droplets near the center. This results in a curvature opposite to that caused by aerodynamic retardation, however, after a given amount of flight time, this initial curve tends to reverse itself, and if properly applied results in a straight line of droplets striking the printing medium. The use of control algorithms to vary the deflection information for the different streams is difficult to implement, and results in an increase in system hardware and cost.

The second method set forth for correcting the effects of aerodynamic retardation is to use a compensating velocity across the array rather than varying the time of flight. If the velocities of the edge streams are greater at break-off by a properly chosen amount than those on the interior, then aerodynamic retardation tends to negate the effect of the induced velocity nonuniformity during flight, causing the droplets to arrive at the paper simultaneously. The velocity variation at break-off can be accomplished by making the nozzle exit diameters progressively larger from the array center to both edges. This, however, requires precision tooling of the ink jet array head which is relatively expensive and difficult to implement.

In U.S. Pat. No. 3,562,757 of Bischoff, an ink jet system is disclosed having a single stream, wherein drop-to-drop retardation is corrected for, rather than a stream-to-stream differential retardation. Bischoff states that each drop in a stream leaves in its wake a region of turbulence which causes some amount of uncertainty in the predictable path of a following drop which enters the region of turbulence. Bischoff, therefore, charges every other drop, such that every other drop is guttered thereby affecting an increase in distance between the drops which are used for printing, thereby reducing the wake between the drops used for printing. The system set forth in Bischoff for correcting for drop-to-drop retardation would have little if any effect on compensating for the differential retardation from stream to stream in a linear ink jet array.

U.S. Pat. No. 3,596,275 of Sweet also deals with the problem of drop to drop retardation. Sweet, however, teaches the use of a colinear stream of air with the ink droplet stream to reduce the effects of wake of a given droplet relative to a following droplet. There is no teaching in Sweet of the use of such a colinear airstream to reduce the effects of stream-to-stream differential retardation, however, the colinear airstream would result in such a reduction of the differential aerodynamic retardation. The means to produce the colinear airstream, however, is difficult to achieve. This is so, since the passageway for the airflow must be properly designed to result in laminar airflow. Also, a fan or the like must be utilized to generate the airflow which increases the bulk and cost of the system.

According to the present invention, method and apparatus is set forth for reducing the effect of differential aerodynamic retardation between streams by utilizing droplet streams on the perimeter of the array which are continuously guttered. The continuously guttered droplet streams produce an airflow which tends to reduce the aerodynamic retardation of the droplet streams on the interior of the array which are used for printing. The use of continuously guttered droplet streams for producing an airflow is relatively inexpensive and easy to implement.

SUMMARY OF THE INVENTION

According to the present invention, a jet printer is set forth having an array of N nozzles. There is means for emitting droplet streams from each of the N nozzles, with the droplet streams emitted from at least the first and Nth nozzles being continuously guttered, and the droplet streams emitted from the other nozzle being one of selectively guttered or directed to a printing medium, with the airflow created by the permanently guttered droplet streams tending to reduce the aerodynamic retardation of the droplet streams emitted from the other nozzles.

DETAILED DESCRIPTION OF THE INVENTION

Figure 1:
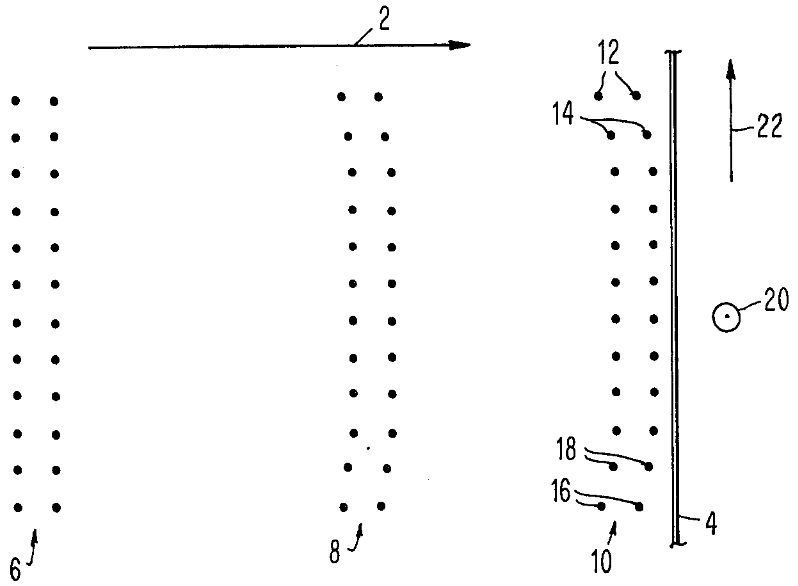
FIG. 1 is a pictorial representation of the effect of differential aerodynamic drag on an array of droplets traveling towards a printing medium.

FIG. 1 illustrates an array of ink droplets in flight traveling in a direction, as indicated by the arrow 2, to a printing medium such as a paper 4. The deflection signal which is applied to all of the ink jets simultaneously is the same, however the placement of droplets becomes progressively more curved as the streams approach the paper 4. At close to the source, the group of droplets 6 are in line, however as they approach the paper, they tend to become more curved on the perimeter thereof as indicated at 8. Just prior to reaching the paper, as indicated at 10, droplets 12, 14, 16 and 18 are traveling at a lower velocity and suffer a greater retardation or drag than the droplets on the interior of the array and accordingly will strike the paper 4 at a later time.

Figure 2:
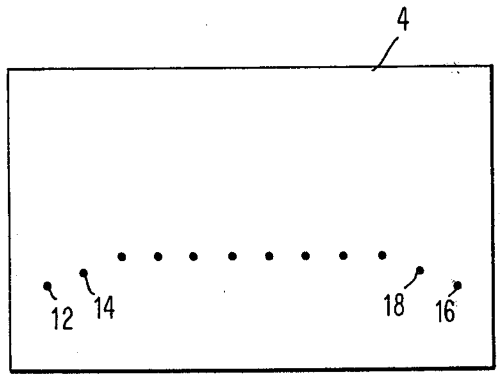
FIGS. 2 and 3 are pictorial representations of a line printed on a printing medium by a row and a column of nozzles, respectively.
Figure 3:
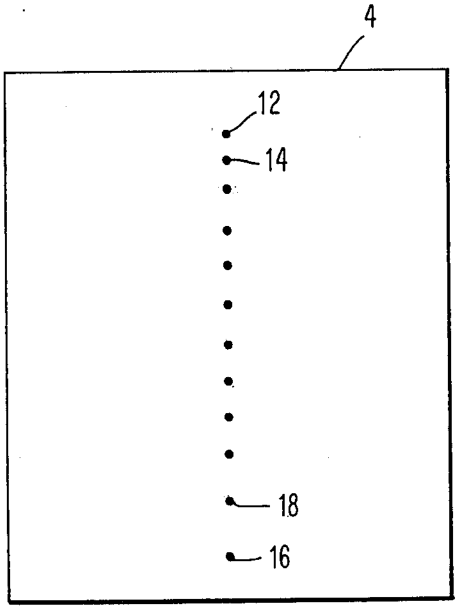

If it is assumed that the droplets are emitted from a row of nozzles, FIG. 1 is a top view of the droplet streams, and the paper 4 is moving out of the figure as indicated at 20. In such an instance, the droplets strike the page in such a manner that the line is curved as indicated on FIG. 2. If, on the other hand, it is assumed that the droplets are emitted from a column of nozzles, FIG. 1 is a side view of the droplet streams, and the paper 4 is traveling in the direction of an arrow 22. If this is the case, the resultant line is vertical as shown in FIG. 3, where it is seen that the droplets 12 and 14 are spaced relatively close to one another, and the droplets 16 and 18 have a greater spacing. In each case the spacing is due to the movement of the paper and the reduced velocity of the droplets. It is seen that the curves or skewed lines resulting from the misregistration of the droplets produces a poor print quality.

Figure 4:
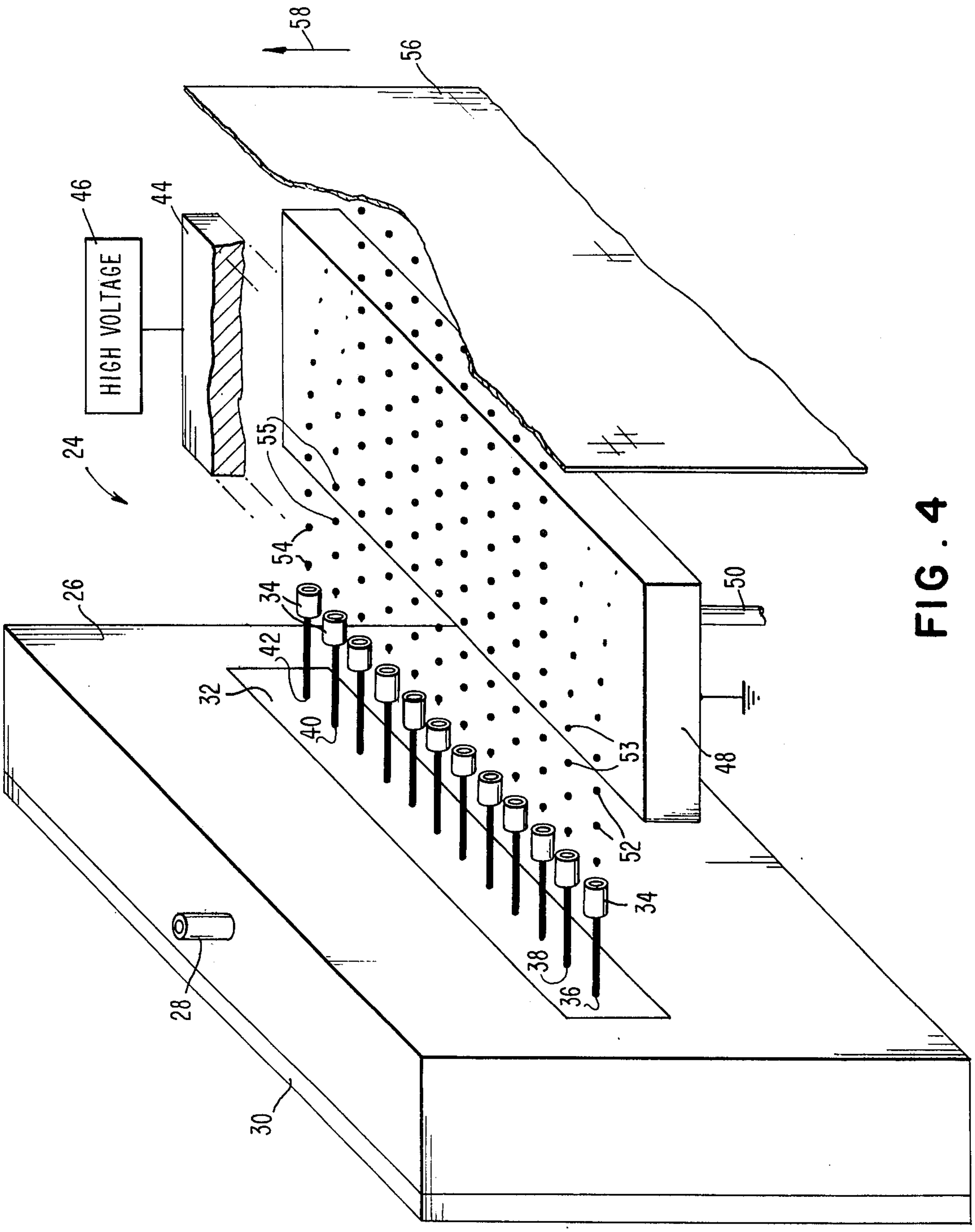
FIGS. 4 and 5 are schematic diagram representations of jet printing arrays according to the present invention.

FIG. 4 illustrates a jet printer generally illustrated at 24 which includes an array of N nozzles. The droplet streams emitted from the nozzles on the perimeter of the array are permanently guttered, and the airflow created by the permanently guttered droplet streams reduces the differential aerodynamic retardation of the droplet streams emitted from the nozzles on the interior of the array.

A manifold 26 receives ink via a conduit 28 from a source (not shown). A piezioelectric crystal 30 is attached to the manifold 26 for vibrating the manifold such that the droplet streams emitted from the respective nozzles in the array are synchronized with one another, i.e., the streams break up to form droplets at substantially the same time. A nozzle plate 32 has N nozzles formed therein. The nozzle plate 32 may, for example, be formed of a sheet of metal which has holes drilled therein for forming the respective nozzles, or alternatively the nozzle plate 32 may be formed of a semiconductor device such as silicon which has the respective nozzles etched therein. Any other suitable nozzle array may be utilized in the practice of the present invention.

The ink jet streams emitted from the respective nozzles are directed through charge electrodes 34, to which a charging voltage may be applied (from a source not shown) for charging the droplets as they break off from the respective ink jet streams. The convention is adopted that charged droplets are guttered and not used for printing, and uncharged droplets are used for printing. Accodingly, the droplet streams emitted from the nozzles on the perimeter of the array are continuously guttered, and the droplet streams emitted from the interior of the array are selectively guttered or directed to the printing medium for printing on same.

For purposes of description, it is assumed that the droplet streams emitted from the first through Hth and Kth through Nth nozzles are continuously guttered. For the array shown, the droplet streams emitted from the first and second nozzles 36 and 38, respectively, are continuously guttered as are the ink droplet streams emanating from the 11th and 12th nozzles 40 and 42, respectively. It is seen that the droplet streams from at least the first and Nth nozzles are to be continuously guttered in the practice of the present invention. The ink droplet streams emitted from the Hth + 1 through Kth − 1, i.e., the 3rd through 10th nozzles are selectively guttered or directed to the printing medium, as previously explained. It is seen, therefore, that the charge electrodes 34 operative with the ink jet streams emitted from the nozzles 36, 38, 40, and 42 have a voltage applied to them continuously from the source (not shown). The charge electrode structures operative with the other nozzles have voltage selectively applied to them in accordance with whether or not it is desired to print with the droplet streams emitted from the respective nozzles.

A high voltage plate 44 (shown broken) has voltage applied thereto from a source 46. A low voltage plate 48 is connected to circuit ground, and acts as a gutter as well as the low voltage deflection electrode.

Droplet streams which have been charged are deflected to the electrode 48 and the ink is returned to an ink supply (not shown) via a conduit 50. For purposes of illustration, droplet streams 52, 53, 54 and 55 emanating from the nozzles 36, 38, 54 and 55, respectively on the perimeter of the array are shown as continuously guttered, whereas the droplet streams emitted from the remaining nozzles are shown as being directed to the printing medium 56. As was peviously explained, the droplet streams emitted from the other nozzles may be selectively guttered. The printing medium 56 travels in the direction of an arrow 58.

The droplet streams emitted from the nozzles on the perimeter of the array tend to attract contaminants, and accordingly these contaminants are prevented, to a great extent, from being attracted to the droplet streams on the interior of the array. It follows, that these contaminants must be filtered from the ink before it is recirculated to the manifold 26. If, the droplet streams emitted from the nozzles on the perimeter of the array are isolated from the other droplet streams when guttered, this reduces the filtration requirements of the system.

Figure 5:
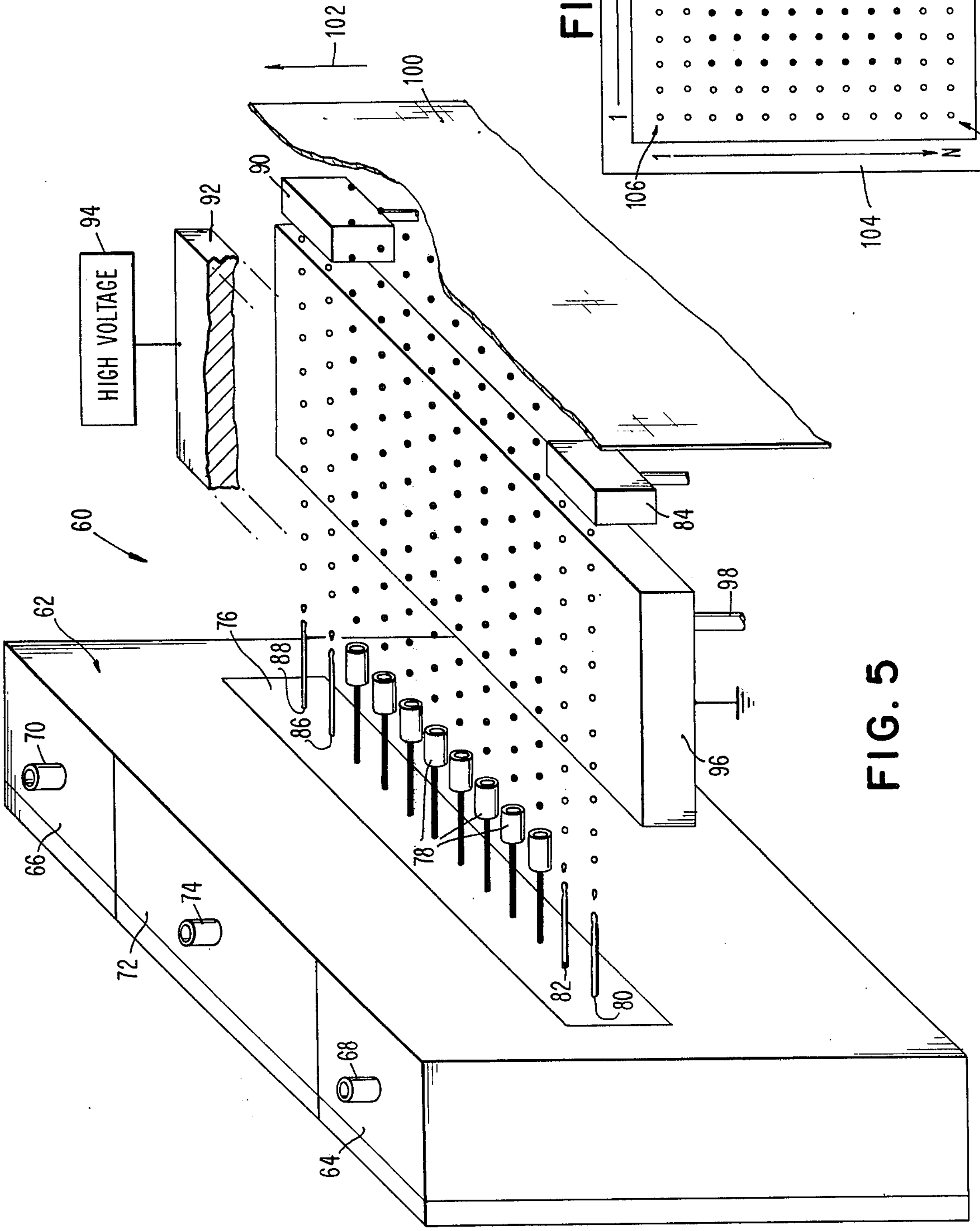

FIG. 5 illustrates a jet printer, generally illustrated at 60, in which non-marking droplet streams are emitted from the nozzles on the perimeter of the array and marking droplet streams are emitted from the other nozzles in the array. The non-marking droplet streams are continuously guttered to a single gutter, or two gutters which are isolated from the gutter to which the marking fluid streams are selectively guttered. Accordingly, the contaminants picked up by the non-marking fluid streams are isolated from the marking droplet streams which improves the filtration of the system. The viscosity of the marking liquid streams is maintained substsantially constant due to the humid environment provided by the non-marking liquid steams. Since the viscosity remains substantially constant, the velocity of the marking liquid streams remains substantially constant, obviating the need for apparatus to compensate for sensed velocity changes of the marking liquid streams.

A manifold 62, includes reservoirs 64 and 66 which receive a non-marking low viscosity liquid such as water, alcohol, etc. via conduits 68 and 70 respectively from a source (not shown). A reservoir 72 receives a marking liquid such as ink via a conduit 74 from a source (not shown). A nozzle plate 76, which may be identical to nozzle plate 32 shown in FIG. 4, has an array of N nozzles formed therein. The non-marking liquid is emitted from the 1st through Hth nozzles and the Kth through Nth nozzles, i.e., the 1st and 2nd and 11th and 12th nozzles. The marking liquid is emitted from the Hth + 1 through Kth − 1 nozzles, i.e., the 3rd through 10th nozzles. Charging electrodes 78 are operative with the ink droplet streams emitted from the Hth + 1 through Kth − 1 nozzles, and there are no charge electrodes operative with the 1st through Hth and Kth through Nth nozzles. This is so, since the non-marking droplet streams emitted from the 1st and Hth nozzles 80 and 82, respectively, are aimed directly at a gutter 84, and the droplet streams emitted from the Kth and the Nth nozzles, 86 and 88 respectively, are aimed directly at a gutter 90. Alternatively, charge electrodes could be operative with the 1st and 2nd and 11th and 12th nozzles, with the respective droplet streams being continuously charged, with the charged droplets being deflected to a low voltage deflection plate which serves as a gutter. In this instance, however, the low voltage deflection plates must be isolated from the low voltage deflection plate operative with the marking droplet streams.

A high voltage plate 92 is connected to a high voltage source 94. A low voltage deflection plate 96, which is connected to circuit ground, also serves as a gutter for the marking droplet streams which are selectively guttered, with the ink being returned to a reservoir (not shown) via a conduit 98. The droplet streams emitted from the interior of the array which are used for printing purposes are directed to a printing medium such as a paper 100 which travels in the direction of the arrow 102. The jet printer illustrated not only compensates for the effects of differential aerodynamic retardation, but also improves the filtration of the printing system by isolating contaminants from the marking liquid.

Figure 6:
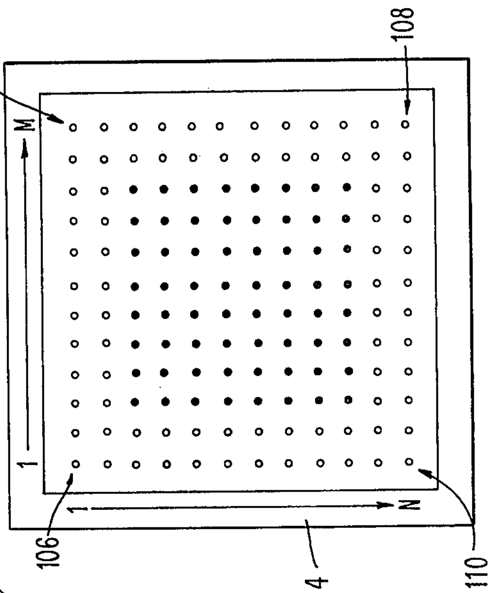
FIG. 6 is a front view of an ink jet array according to the present invention.

FIG. 6 is a front view of a nozzle plate 104 which has formed therein N rows, 106 to 108, and M columns, 110 to 112, of nozzles. In such an array it is necessary to shield the droplet streams on the interior of the array from the aerodynamic drag created by the droplet streams emanating from the nozzles on the exterior of the array, such that the effects of aerodynamic retardation are reduced. The nozzles on the perimeter of the array which are indicated as unshaded circles emit either a marking fluid or a non-marking fluid which is continuously guttered, as set forth in FIGS. 4 and 5, respectively. The nozzles on the interior of the array which are illustrated as shaded circles emit a marking liquid which is one of selectively guttered or directed to the printing medium. Again, the continuously guttered droplet streams on the perimeter of the array reduce the effects of aerodynamic retardation on the droplet streams emitted on the interior of the array, and in the instance when a non-marking liquid is utilized for the droplet streams emitted from the nozzles on the perimeter, the filtration of the system is improved.

In summary, a jet printer has been described which includes an array of N nozzles, with the droplet streams emitted from the nozzles on the perimeter of the array being continuously guttered, and the droplet streams emitted from the other nozzles in the array being one of selectively guttered or directed at a printing medium, with the airflow created by the continuously guttered droplet streams tending to reduce the aerodynamic retardation of the droplet streams emitted from the other nozzles, thereby reducing the misregistration of droplets on the printing medium.

What is claimed is:

1. In a jet printer, the combination comprising:

a multiple nozzle array having at least one row of nozzles, with N nozzles in said one row; and means for emitting a non-marking droplets stream from at least the first and Nth nozzles for creating a colinear airflow, including means for emitting a marking droplet stream from each of the other nozzles, with the airflow created by the emitted non-marking droplet streams being used to reduce the aerodynamic retardation of the emitted marking droplet streams.

2. The combination claimed in claim 1, wherein said marking droplet streams are ink, and said non-marking droplet streams are comprised of a low viscosity liquid.

3. The combination claimed in claim 1, wherein a non-marking droplet stream is emitted from each of the first through Hth nozzles and Kth through Nth nozzles, and a marking droplet stream is emitted from each of the Hth + 1 through Kth − 1 nozzles, where $1 < H < K < N$.

4. The combination claimed in claim 3 including means for continuously guttering each of the non-marking droplet streams emitted from the first through Hth and Kth through Nth nozzles.

5. The combination claimed in claim 4, including three gutters, namely a first gutter operative with each of the first through Hth non-marking droplet streams, a second gutter operative with each of the Hth + 1 through Kth − 1 marking droplet streams, and a third gutter operative with each of the Kth through Nth non-marking droplet streams.

6. In a multiple nozzle jet printer having at least one row of nozzles, with N nozzles in said one row, a method of reducing the aerodynamic retardation of certain droplet streams emitted from said one row, said method comprising the steps of:

emitting a non-marking droplet stream from at least the first and Nth nozzles in said one row for creating a colinear airflow; and emitting a marking droplet stream from each of the other nozzles in said one row, with the airflow created by the non-marking droplet streams being used to reduce aerodynamic retardation of the marking droplet streams.

* * * * *